Patented Feb. 28, 1939

2,148,970

UNITED STATES PATENT OFFICE 2,148,970

PROCESS FOR LIQUID PURIFICATION

Oliver M. Urbain and William R. Stemen, Columbus, Ohio, assignors to Charles H. Lewis, Harpster, Ohio No Drawing. Application February 24, 1938, Serial No. 192,424

6 Claims. (Cl. 210—24)

This invention relates to water softening and liquid purification. More specifically, it relates to the removal of cations from liquids by a process of cation or base exchange.

Processes of water softening and cation removal have been known for a number of years. Perhaps the most commonly used materials are the zeolites, or alumino-silicates, although many other compounds having base exchange properties have been prepared. Such compounds, however, are not satisfactory for use in waters of high acidity inasmuch as they tend to break down and lose their physical structure when brought into contact with acids.

To overcome these difficulties in the softening of waters of high acidity, efforts have recently been made to employ hydrogen permutites or carbonaceous materials having exchangeable hydrogen ions. Although such materials do effect water softening and cation removal in acid solutions, their capacity for cation exchange is very limited, thus making it necessary to employ large quantities of such materials and resulting in excessive costs for softening of waters of high hydrogen ion concentration.

Considerable difficulty has also been experienced in the regeneration of those hydrogen permutite exchange materials now employed to effect cation exchange in acid mediums. Such materials appear to be effective only in their original form, wherein they possess hydrogen ions, and often have little or no cation exchange capacity after attempted regeneration.

It is an object of this invention to provide processes for water softening and liquid purification employing materials which will function satisfactorily in acid mediums. It is a further object to provide materials for base exchange having a high capacity for cations. Additionally, it is an object of this invention to provide a process for cation exchange which will permit the regeneration of the materials employed without appreciable loss.

Other objects will be apparent to those skilled in the art from the following description of the processes and materials employed.

The materials employed in the processes of the invention are solid insoluble cyclic organic compounds containing imino radicals within the ring structure. Additionally, one of the atoms to which the imino group is attached must possess a double bond connection with a third atom. Such compounds are characterized in that they possess ionizable hydrogen atoms which give exchange properties to such compounds. The materials may contain a plurality of replaceable hydrogen atoms. The general structure of the imino component of such compounds may be represented by the formula >N—H, the free bonds of which are attached to other elements or groups in the material.

For an efficient exchange material, it is necessary that the solubility of such compounds be less than 0.06 grams in 100 cc. of water at 20° C. Materials of higher solubility than this, though effective, lose their efficiency and make necessary frequent replacements during the process of exchanging cations.

It has been found that derivatives of such compounds with cations, i. e., compounds in which the hydrogen of the imino group has been exchanged for cations, are also effective as cation exchangers. For example, a sodium imino compound having a sodium atom in place of the hydrogen atom may be utilized to effect removal of calcium cations from hard water.

It has also been found that polymers of such compounds possess the same properties of cation exchange.

Accordingly, the term "water insoluble solid cyclic organic compounds having an imino group within the ring and adjacent thereto an atom which is double bonded to a third atom" will be used to refer to all such compounds, i. e., those with replaceable hydrogen, other replaceable cations, or polymers thereof.

It has been found that insoluble cyclic imino compounds characterized as above possess a large capacity for cation exchange, possess good physical characteristics for use in exchange processes, and are in general cheaply prepared.

Exemplary of the materials which have been found satisfactory are the following:

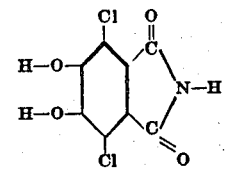

3,6-dichloro-4,5-dihydroxyphthalimide

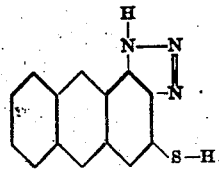

4-mercaptoanthratriazole

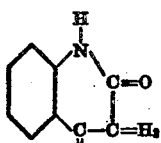

2,4-quinolinedione

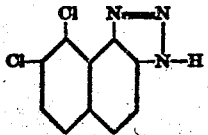

8,9-dichloronaphthotriazole

Methods for the preparation of such compounds are commonly known since such materials are not new compounds. Their property of exchanging cations, however, has never before been known so far as applicants have been able to discover.

To illustrate the method of preparation of one of the above compounds, there is given the equation for the preparation of 8,9-dichloronaphthotriazole:

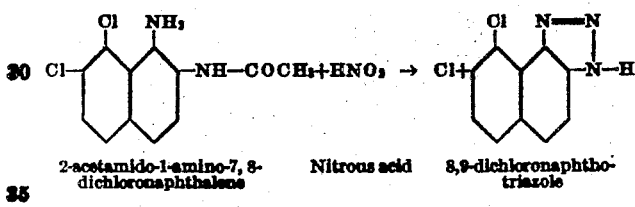

2-acetamido-1-amino-7,8-dichloronaphthalene / Nitrous acid / 8,9-dichloronaphthotriazole / Acetic acid Other insoluble cyclic imino compounds having the defined characteristics may be prepared by conventional organic reactions, as will be apparent to those skilled in the art.

As has been previously mentioned, polymers of the above compounds may be utilized to effect cation exchange. It has been found that polymerization of such exchange compounds reduces their solubility and thereby enhances their value in cation exchange processes. Polymerization may be effected by adding vinyl groups or polyhydroxy groups to any of the compounds falling within the class above defined, and proceeding in conventional polymerization methods.

The base exchange materials thus prepared are employed in water softening or liquid purification in conventional methods. They may be utilized in contact filters and adapted to use in the filter bed type of water softening equipment, or they may be added directly to the liquid with agitation, after which the converted exchange compounds are separated and removed from the treated water or purified liquids.

Reactions of insoluble cyclic organic compounds having an imino group within the ring and adjacent thereto an atom which is double bonded to a third atom, with hardness forming cations or with organic cations which one may be desirous of removing from a solution, are given in the following equations. For purposes of illustration, the exchange materials are shown as containing only one active group, but it should be understood that such materials may contain a plurality of such active groups.

$$2R{=}N{-}H + CaCl_2 \rightarrow (R{=}N)_2Ca + 2HCl$$

Cyclic imino exchange compound / Calcium chloride / Calcium salt of a cyclic imino exchange compound / Hydrochloric acid $$2R{=}N{-}Na + Mg(CO_3) \rightarrow (R{=}N)_2Mg + Na_2CO_3$$

Sodium salt of a cyclic imino exchange compound / Magnesium carbonate / Magnesium salt of a cyclic imino exchange compound / Sodium carbonate $$R{=}N{-}H + CH_3NH_3OH \rightarrow R{=}N{-}NH_3CH_3 + H_2O$$

Cyclic imino exchange compound / Methylammonium hydroxide / Methylammonium salt of cyclic imino exchange compound / Water In the above equations, "R" represents the relatively inactive cyclic portions of the material which may, of course, be one or more ring structures with or without attached structures. It will be seen that the acidic hydrogen atoms or the cations of the above exchange materials will exchange positions with the cations contained in the water being treated. The exchanged cations form coordinated derivatives with the imino compounds. It is believed that the primary reaction is a cation exchange reaction although it is possible that some sorption also takes place.

As exemplary of the removal of calcium cations from a hard water, there is given the following equation showing the reaction of 8,9-dichloronaphthotriazole with calcium chloride:

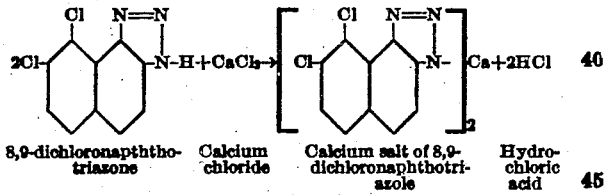

8,9-dichloronaphthotriazole / Calcium chloride / Calcium salt of 8,9-dichloronaphthotriazole / Hydrochloric acid After the exchange materials have become exhausted, they may be regenerated by treating with solutions of acids, salts, or bases. A preferred process of regeneration involves the treating of the exhausted exchange material with solutions containing from 2% to 8% of mineral acids. The regenerating solution may be flowed through the exchange material in the conventional regeneration process, or the exhausted exchange material may be treated with the regenerating liquid in vats or containers.

The regeneration of one of the above described cyclic imino compounds which has been used to remove calcium ions from water may be illustrated by the following equation:

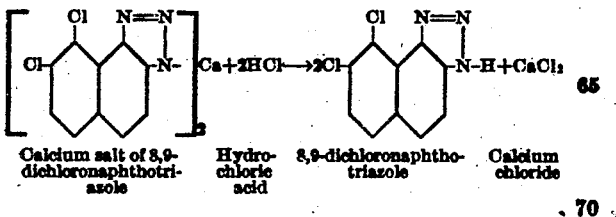

Calcium salt of 8,9-dichloronaphthotriazole / Hydrochloric acid / 8,9-dichloronaphthotriazole / Calcium chloride The cations removed from the water treated will, of course, be found in the regenerating solution, and, if recovery is desired, they can be removed by conventional methods, such as fractional distillation or fractional crystallization.

It is to be expressly understood that the foregoing description and examples are merely illustrative and are not to be considered as limiting this invention beyond the scope of the subjoined claims.

Having thus described our invention, we claim:

1. A process of liquid purification which comprises exchanging cations by contacting the liquid with a water insoluble solid cyclic organic compound having an imino group within the ring and adjacent thereto an atom which is double bonded to a third atom.

2. A process of water purification which comprises removing hardness-forming cations by contacting the water with a water insoluble solid cyclic organic compound having an imino group within the ring and adjacent thereto an atom which is double bonded to a third atom.

3. A process for exchanging cations in liquids of high acidity which comprises contacting the liquid with a water insoluble solid cyclic organic compound having an imino group within the ring and adjacent thereto an atom which is double bonded to a third atom, characterized in that it is stable in acid solutions, possesses high exchange capacity, and is capable of being regenerated without appreciable loss.

4. A process for exchanging cations in liquids which comprises the steps of adding to the liquid a water insoluble solid cyclic organic compound having an imino group within the ring and adjacent thereto an atom which is double bonded to a third atom, agitating for a short period, and effecting removal of the converted exchange material.

5. A process for exchanging cations in liquids which comprises the step of passing the liquid through a filter charged with a water insoluble solid cyclic organic compound having an imino group within the ring and adjacent thereto an atom which is double bonded to a third atom.

6. A process for exchanging cations in liquids which comprises the steps of passing the liquid through a filter charged with a water insoluble solid cyclic organic compound having an imino group within the ring and adjacent thereto an atom which is double bonded to a third atom, and regenerating the exchange material by treatment with solutions containing exchangeable cations.

OLIVER M. URBAIN.
WILLIAM R. STEMEN.